United States Patent [19]

Knappe

[11] Patent Number: 4,968,544

[45] Date of Patent: Nov. 6, 1990

[54] WATER-RESISTANT LAMINATE WITH HIGH EXTENSION CAPACITIES

[76] Inventor: Holger Knappe, Ringstrasse, 2061 Grabau, Fed. Rep. of Germany

[21] Appl. No.: 230,679

[22] Filed: Aug. 8, 1988

[30] Foreign Application Priority Data

Jun. 7, 1985 [DE] Fed. Rep. of Germany ....... 3520345

[51] Int. Cl.[5] ........................ B32B 17/04; B65D 25/00
[52] U.S. Cl. .................................. 428/36.1; 428/294; 428/411.1; 428/480
[58] Field of Search ..................... 428/411.1, 480, 482, 428/212, 36.1, 36.3, 294

[56] References Cited

U.S. PATENT DOCUMENTS

| | | | |
|---|---|---|---|
| 3,567,536 | 3/1971 | Wickersham | 428/315 |
| 3,969,313 | 7/1976 | Aishima et al. | 523/202 |
| 3,992,080 | 11/1976 | Rowland | 264/1.9 |
| 4,096,047 | 6/1978 | Hale et al. | 204/415 |
| 4,288,563 | 9/1981 | Thorpe | 428/480 |
| 4,315,964 | 2/1982 | Ozaki et al. | 428/182 |
| 4,421,825 | 12/1983 | Seiter | 428/332 |
| 4,454,284 | 6/1984 | Ueno et al. | 524/427 |
| 4,495,333 | 1/1985 | White | 525/150 |
| 4,595,620 | 6/1986 | Dighton et al. | 428/35 |

OTHER PUBLICATIONS

Kunststoffe 78 (1988) 12, pp. 1197–1200.
Multi-Tex Produktions—und Vertriebs GmbH (1988).
Enzyklopädie Naturwissenschaft und Technik (1981), p. 4861.

*Primary Examiner*—James Seidleck
*Attorney, Agent, or Firm*—Cushman, Darby & Cushman

[57] ABSTRACT

The invention relates to a composite synthetic resin comprising a combination of fiber-reinforced unsaturated polyester resins and styrene-modified polyphenyl oxide as well as the use of these synthetic reins for manufacturing storage containers for water or substantially aqueous solutions. Further, the invention comprises a composite synthetic resin that is characterized by a fiber proportion of over 60% of the fiber-reinforced unsaturated polyester resin used.

5 Claims, 1 Drawing Sheet

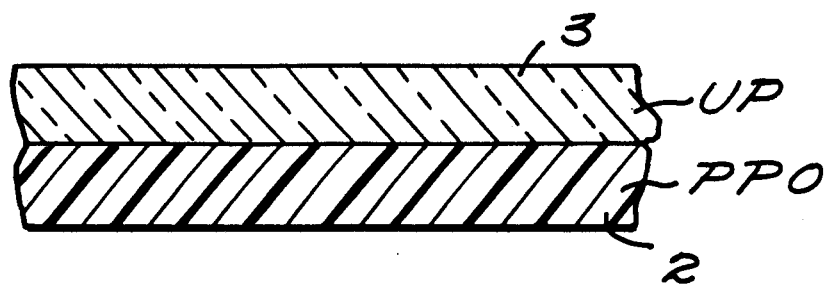
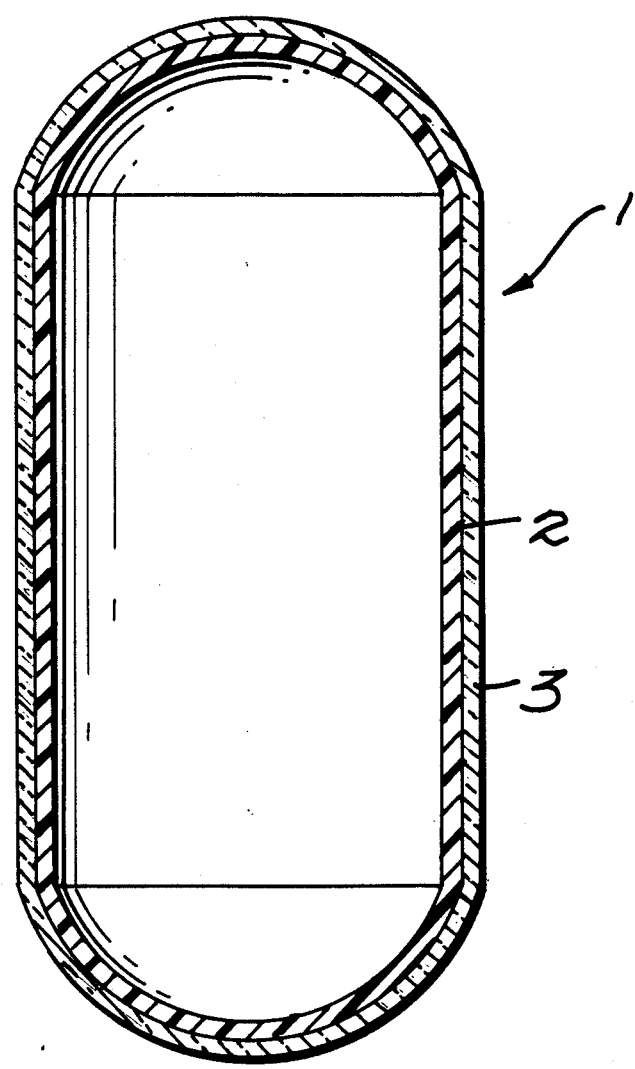

WATER-RESISTANT LAMINATE WITH HIGH EXTENSION CAPACITIES

This is a continuation of application Ser. No. 06/871,890, filed June 9, 1986, now abandoned.

The invention relates to composite synthetic resins, in particular for use as storage containers for water or for predominantly aqueous solutions.

The term "composite materials" refers generally to materials that are a composite of different material groups, such as metals, synthetic resins, glasses or ceramic materials, and hence that have material properties not attainable with only a single material group. Among the most important composite materials are fiber-composite materials, in which the great strength of certain materials, in the form of fibers of extremely thin monocrystal needles, is exploited in order to make a basic material stronger and more rigid, or in other words to increase both its strength and its modulus of elasticity. The basic material performs the task of three-dimensionally fixing the fibers, protecting them from corrosion and, finally, optimizing the induction of force into the fibers. Among the best-known fiber-composite materials are glass- and carbon-fiber-reinforced synthetic resins, as have long been used for manufacturing household articles, in silos, or in vehicle construction, for example. Composite materials of two or more different synthetic resins, each of them being either modified or unmodified, are also known and are generally referred to as "sandwich composites": in these cases, again, the goal is to optimize a number of desirable properties by combining various synthetic resins. Sandwich synthetic resins can be produced by injection molding, in which the swelling of the materials as they flow into the mold is exploited, with the skin at the periphery of the material that adheres to the mold walls and sets there being filled with a different type of core material. Extrusion molding is also possible, for in sandwich co-extrusions separate flows of material are used for the skin and the core, which are then united in the die. Thermoforming methods for producing sandwich structures are also quite well known and are used particularly for thermoplastic synthetic resins. Other possible manufacturing processes include gluing or bonding, which are used to some extent as well.

Composite synthetic resins have already been introduced in many fields as substitutes for formerly conventional materiials; however, in some fields it has still not been possible to use these products, because either their mechanical properties or other characteristics prevented their use in place of metal or glass materials until now. Among these fields are the manufacture of water storage containers, especially so-called "spas", which at present are still virtually all made solely of enameled steel. Enameled steel storage containers, however, are especially vulnerable to corrosion, because harline cracks in the enamel layer are virtually unavoidable and the equipment is typically operated at temperatures of approximately 60° or more, and not only the layman but the specialist as well is helpless in the face of the corrosive properties of water for industrial use and drinking water at such high temperatures. Experience teaches that such water storage containers are usable for no more than about two years and must then be replaced because of corrosion damage. Many studies have already been made, and a number of experiments have also been carried out, to make such water storage containers out of synthetic resins instead of metal, but heretofore these experiments have not produced usable results. The reason is that on the one hand, water storage containers must as a rule hold a considerable volume of up to several hundred liters, and thus because of the mechanical properties of the synthetic resins the necessary wall thicknesses lead to very large containers taking up a great deal of space, which are moreover expensive to manufacture and hence are hardly, if at all, competitive in comparison with conventional storage containers. It has proved to be particularly disadvantageous, however, that when conventional synthetic resins are used, even though the service life can be extended somewhat as compared to metal equipment, nevertheless a truly considerably lengthened service life, on the order of ten years or so, remains unattainable, because at an elevated temperature the water contained in the container also causes changes in the synthetic resins. Synthetic resins including ester or amide compounds already undergo a certain hydrolysis after only a relatively short time, so that over the short or long run the mechanical strength of the container is greatly impaired from the inside of the container out, because of the chemical changes, and so the service life of the equipment is still not any longer. If glass-fiber-reinforced synthetic resins are used, it has already even happened that after some time, chemical changes on the inside of the container have caused glass fibers to become loose, which presents a danger when water for industrial use or for drinking is being stored. Thus for a storage container for relatively large quantities of water or for predominantly aqueous solutions, the use of synthetic resin was not heretofore considered promising, and so it is the object of the invention to develop a novel composite material that can be used for these applications as well.

Accordingly, a composite synthetic resin is proposed which is characterized by a combination of glass-fiber-reinforced unsaturated polyester resins and styrene-modified polyphenylene oxide.

Unsaturated polyester resins, usually abbreviated as UP, are known duroplastics, which are produced by esterification with dialcohols, predominantly from ethylene glycol to butylene glycol with fumaric acid or maleic anhydride and partly saturated diacids such as phthalic acid, isophthalic acid or HETacid or adipic acid. Sometimes diallyl phthalate is condensed in as well, and the polyester also mixed with styrene. Exothermic cross-linking polymerization between the polyester chains is generally initiated by peroxide accelerators or by irradiation. Unsaturated polyester resins are widely used as an additive to concrete or adhesive mortars in construction, as casting resins in electrical engineering and for molded parts, in the latter case usually in the form of fiber-reinforced synthetic resins. For this purpose, glass fibers are usually used, in a proportion that can be approximately 10 to 80% of the mixture, depending on the intended application. Unsaturated polyester resins are available on the market in the form of so-called "pre-mixes", to which all that has to be added before processing is the accelerator. Besides glass fibers, carbon fibers or fiber mats or fiber inlays can also be used for reinforcing unsaturated polyester resins. Depending on the composition of the polyester mixture and the proportion of fiber reinforcement, the flexural strength and tensile strength can be varied within wide limits. According to the invention, polyester resins having a glass fiber proportion of approximately 25 to 30%, a tensile strength of approximately 70 to 120 N/mm$^2$ and a flexural strength of approximately 120 to 180 N/mm$^2$ are preferred.

Polyphenylene oxide is a thermoplastic, abbreviated as PPO, which is produced by polycondensation of disubstituted phenols with relatively small side groups. The polyether thus being formed has great rigidity and high shape stability in heat and also has only a slight water absorption capacity. Today, instead of polyphenylene oxide, polyphenylene oxide modified with styrene is preferably used, because an oxidative degradation can be ascertained in the homocondensate at relatively high temperatures. In contrast, the modified PPO has a greater thermal resistance and a greater oxidation resistance as well, while its mechanical properties are substantially unchanged. Modified PPO is processed into a number of molded parts, such as radio and television equipment, switch housings, fixtures, lock fittings and the like. Modified PPO is considered harmless to health and is permitted by the FDA.

It was known that polyphenylene oxide, as well as its modified variants, tend toward oxidative degradation in long-term use in air at elevated temperatures; thus it was all the more unexpected to find that when modified polyphenylene oxide is used as the inner lining of water storage containers, excellent resistance to oxidation and hydrolysis can be ascertained. In contrast to all the synthetic resins tested previously, no corrosive changes or any impairment of the mechanical properties of the inner skin could be found even after several years of use, so that according to the invention water storage containers having a reliable lifetime of 10 years can be manufactured. However, the mechanical load capacity, in use as storage containers subject to pressure, is not high enough in modified PPO that the container shells could be manufactured solely from this synthetic resin. Therefore in accordance with the invention, styrene modified PPO is used as the inside of the composite material, and glass-fiber-reinforced polyester resin is used as the outside of the storage container. The improved mechanical properties of the polyester, namely tensile strength and flexural strength in the range from approximately 70 to 120 and 120 to 180 N/mm$^2$, respectively, in contrast to approximately 40 to 60 and 80 to 105 N/mm$^2$, respectively, for styrene modified polyphenylene oxide make it possible to manufacture large shapes as well, which are preferably made by injection molding, by hot deformation or by the application of glass fibers and ester to the prefabricated inner shell.

Naturally, the composite synthetic resins according to the invention can be used not only for water storage containers for industrial water or drinking water, but also in any other fields in which water or predominantly aqueous solutions must be stored at elevated temperatures, such as in industrial parks, commercial enterprises and so forth.

The invention will now be described in greater detail in conjunction with an example:

EXAMPLE

A pre-mix of UP with glass fiber in a proportion of approximately 25% is deep-drawn to form storage container shell halves, after the addition of a photoaccelerator by the negative process. After photohardening and trimming of the edges, the container shell halves themselves serve as the mold for further processing. At the flange opening, and optionally at other openings provided, the shell halves are provided with an adhesion promoter; then a shell half of styrene modified PPO is drawn into the mold.

The wall thickness of this second shell half may be varied within wide limits.

As the styrene modified PPO, a PPO with a water absorption capacity of a maximum of 0.08%, but generally less than 0.07%, is preferably used.

After the openings, flanges and connections have been made, the container halves are joined together in the usual manner, for instance by ultrasonic welding or gluing or with screws.

Further explanation will be made in conjunction with the accompanying drawings, in which FIG. 1 is a cross section through the composite synthetic resin according to the invention, and FIG. 2 is a cross section through a storage container.

BRIEF DESCRIPTION OF THE DRAWING

FIG. 1 shows a cross section taken through the composite synthetic resin, in which one layer is of modified PPO and the other layer is of glass-fiber-reinforced UP.

FIG. 2, in cross section and with the walls drawn on a greatly enlarged scale, shows a storage container 1, in which the walls are made of styrene modified PPO on the inside and of glass-fiber-reinforced polyester resin on the outside.

The invention relates to water-resistant and highly stretch-resistant composite synthetic resins comprising a combination of fiber-reinforced unsaturated polyester resins and styrene-modified polyphenylene oxide.

From patent application No. P 33 42 386, composite synthetic resins comprising glass-fiber-reinforced unsaturated polyester resins and styrene-modified polyphenylene oxide are known, which can particularly favorably be used as water storage containers for industrial and household water, expecially at elevated temperatures. It has now been found that in some fields of use of such water storage containers, it is desirable for the part of the composite synthetic resin forming the outer jacket of the storage containers, comprising unsaturated fiber-reinforced polyester resins, to have the lowest possible stretching rate; this is particularly true if the water storage containers are to be used as pressure containers, with rated overpressures of approximately 10 bar or more. Overly pronounced stretching of the part of the composite synthetic resin forming the jacket could cause the PPO component of the synthetic resin to loosen and hence damage this so-called "liner".

According to the invention, composite synthetic resins for the purposes described in patent application P 33 42 386 are therefore proposed, which are characterized in that the fiber-reinforced unsaturated polyester resin has a high proportion of fiber, approximately 60 to 80%, in the form of an almost 100% longitudinally laid layer, and hence has flexural strengths in the range from 800 to 1000 N/mm$^2$ and tensile strengths in the range from approximately 700 to 900 N/mm$^2$.

Such composite synthetic resins can be manufactured by the winding process, for example, with the PPO being used as a liner.

Testing of an industrial-water container manufactured in this way, having a capacity of approximately 80 liters, as to its ductility when subjected to internal pressure produced results, according to the regulations of the Technical Service of Bavaria, of a maximal stretching in the container circumferential direction of approximately 4.45%, and in the longitudinal direction of approximately 0.025%. Thus at a typical operating pressure of approximately 10 bar, a theoretical safety of S=5 to 6 is calculated.

What is claimed is:

1. A composite synthetic resin laminate comprising a combination of (1) a layer of a fiber reinforced unsaturated polyester resin having a fiber proportion of approximately 60 to 80% fiber in the form of an almost 100% longitudinally laid layer and (2) a layer of styrene-modified polyphenylene oxide.

2. A composite synthetic resin according to claim 1 wherein layer (1) consists essentially of the fiber-reinforced unsaturated polyester resin and layer (2) consists essentially of the styrene-modified polyphenylene oxide.

3. A liquid storage container comprising the composite synthetic resin laminate of claim 1, wherein said container is used for water or aqueous solutions.

4. A liquid storage container according to claim 3, wherein said container is used for industrial or drinking water.

5. A composite synthetic resin as defined by claim 1, characterized by tensile strength and flexural strength values of the unsaturated polyester in the range of approximately 800 to 1000 N/mm$^2$ and 700 to 900 N/mm$^2$, respectively, and of the modified phenylene oxide from approximately 40 to 60 N/mm$^2$ and 80 to 105 N/mm$^2$, respectively.

* * * * *